United States Patent
Golden et al.

(10) Patent No.: US 6,983,517 B2
(45) Date of Patent: Jan. 10, 2006

(54) RELEASABLE FASTENER SYSTEM

(75) Inventors: Mark A. Golden, Washington, MI (US); John C. Ulicny, Oxford, MI (US)

(73) Assignee: General Motors Corporation, Detroit, MI (US)

( * ) Notice: Subject to any disclaimer, the term of this patent is extended or adjusted under 35 U.S.C. 154(b) by 45 days.

(21) Appl. No.: 10/305,376

(22) Filed: Nov. 26, 2002

(65) Prior Publication Data

US 2004/0074063 A1    Apr. 22, 2004

Related U.S. Application Data

(63) Continuation-in-part of application No. 10/273,691, filed on Oct. 19, 2002.

(51) Int. Cl.
*A44B 18/00*    (2006.01)

(52) U.S. Cl. .......................................... 24/442; 428/100
(58) Field of Classification Search ................... 24/442, 24/446, 451, 452, 450, 448, 304; 428/100
See application file for complete search history.

(56) References Cited

U.S. PATENT DOCUMENTS

| | | | |
|---|---|---|---|
| 2,717,437 A | 9/1955 | DeMestral | 428/92 |
| 2,994,117 A | 8/1961 | McMullin | 24/201 |
| 3,101,517 A | 8/1963 | Fox et al. | 24/442 |
| 3,128,514 A | 4/1964 | Parker et al. | 24/11 HC |
| 3,138,749 A | 6/1964 | Slibitz | 318/135 |
| 3,176,364 A | 4/1965 | Dritz | 24/306 |
| 3,292,019 A | 12/1966 | Hsu et al. | 310/328 |
| 3,365,757 A | 1/1968 | Billarant | 24/442 |
| 3,469,289 A * | 9/1969 | Whitacre | 24/450 |
| 3,490,107 A * | 1/1970 | Brumlik | 24/451 |
| 3,808,648 A | 5/1974 | Billarant et al. | 24/450 |
| 4,169,303 A | 10/1979 | Lemelson | 24/452 |
| 4,382,243 A | 5/1983 | Babitzka et al. | 335/119 |
| 4,391,147 A | 7/1983 | Krempl et al. | 73/730 |
| 4,634,636 A | 1/1987 | Yoshino et al. | 428/500 |
| 4,637,944 A | 1/1987 | Walker | 428/35 |
| 4,642,254 A | 2/1987 | Walker | 428/36 |
| 4,693,921 A | 9/1987 | Billarant et al. | 428/100 |
| 4,752,537 A | 6/1988 | Das | 428/614 |
| 4,775,310 A | 10/1988 | Fischer | 425/308 |
| 4,794,028 A * | 12/1988 | Fischer | 428/100 |
| 4,931,344 A | 6/1990 | Ogawa et al. | 428/100 |
| 5,037,178 A | 8/1991 | Stoy et al. | 385/53 |
| 5,071,363 A | 12/1991 | Reylek et al. | 439/291 |
| 5,133,112 A | 7/1992 | Gomez-Acevedo | 24/450 |
| 5,136,201 A | 8/1992 | Culp | 310/328 |

(Continued)

FOREIGN PATENT DOCUMENTS

DE    199 56 011    6/2001

(Continued)

*Primary Examiner*—Jack W. Lavinder
(74) *Attorney, Agent, or Firm*—Kathryn A. Marra (57) ABSTRACT

A releasable fastener system comprises two hook portions. The hook portions each include a support and a plurality of closely spaced upstanding hook elements extending from one side thereof. When the two hook portions are pressed together they interlock to form a releasable engagement. The resulting joint created by the engagement is relatively resistant to shear and pull forces and weak in peel strength forces. The head elements of the hook elements are formed of a material that provides a change in directional orientation of the head elements. In this manner, the directional orientation of the head elements of the hook elements can be remotely changed to provide a reduction or magnification in the shear and/or pull-off forces.

28 Claims, 5 Drawing Sheets

U.S. PATENT DOCUMENTS

| | | | |
|---|---|---|---|
| 5,182,484 A | 1/1993 | Culp | 310/328 |
| 5,191,166 A | 3/1993 | Smirlock et al. | 89/36.02 |
| 5,212,855 A | 5/1993 | McGanty | 24/452 |
| 5,284,330 A | 2/1994 | Carlson et al. | 267/140.14 |
| 5,312,456 A | 5/1994 | Reed et al. | 24/442 |
| 5,319,257 A | 6/1994 | McIntyre | 310/328 |
| 5,328,337 A | 7/1994 | Kunta | 417/310 |
| 5,474,227 A | 12/1995 | Krengel et al. | 228/147 |
| 5,486,676 A | 1/1996 | Aleshin | 219/121.63 |
| 5,492,534 A | 2/1996 | Athayde et al. | 604/141 |
| 5,497,861 A | 3/1996 | Brotz | 188/267 |
| 5,547,049 A | 8/1996 | Weiss et al. | 188/267 |
| 5,611,122 A | 3/1997 | Torigoe et al. | 24/442 |
| 5,656,351 A | 8/1997 | Donaruma | 428/100 |
| 5,657,516 A | 8/1997 | Berg et al. | 24/452 |
| 5,669,120 A | 9/1997 | Wessels et al. | 24/446 |
| 5,671,498 A | 9/1997 | Martin et al. | 15/244.3 |
| 5,712,524 A | 1/1998 | Suga | 310/328 |
| 5,725,928 A | 3/1998 | Kenney et al. | 428/100 |
| 5,797,170 A | 8/1998 | Akeno | 24/452 |
| 5,798,188 A | 8/1998 | Mukohyama et al. | 429/34 |
| 5,814,999 A | 9/1998 | Elie et al. | 324/662 |
| 5,816,587 A | 10/1998 | Stewart et al. | 280/5.516 |
| 5,817,380 A | 10/1998 | Tanaka | 428/100 |
| 5,885,652 A | 3/1999 | Abbott et al. | 427/163.2 |
| 5,945,193 A * | 8/1999 | Pollard et al. | 428/100 |
| 5,969,518 A | 10/1999 | Merklein et al. | 324/173 |
| 5,974,856 A | 11/1999 | Elie et al. | 73/11.04 |
| 5,979,744 A | 11/1999 | Brigleb | 229/87.01 |
| 5,983,467 A | 11/1999 | Duffy | 24/442 |
| 6,029,783 A | 2/2000 | Wirthlin | 188/267.1 |
| 6,086,599 A | 7/2000 | Lee et al. | 606/108 |
| 6,102,912 A | 8/2000 | Cazin et al. | 606/61 |
| 6,102,933 A | 8/2000 | Lee et al. | 606/209 |
| 6,129,970 A * | 10/2000 | Kenney et al. | 428/100 |
| 6,148,487 A | 11/2000 | Billarant | 24/442 |
| 6,156,842 A | 12/2000 | Hoenig et al. | 525/171 |
| 6,203,717 B1 | 3/2001 | Munoz et al. | 252/62.52 |
| 6,257,133 B1 | 7/2001 | Anderson | 100/162 B |
| 6,388,043 B1 | 5/2002 | Langer et al. | 528/80 |
| 6,454,923 B1 | 9/2002 | Dodgson et al. | 204/415 |
| 6,460,230 B2 | 10/2002 | Shimamura et al. | 24/452 |
| 6,502,290 B1 | 1/2003 | Tseng | 28/161 |
| 6,544,245 B2 | 4/2003 | Neeb et al. | 24/442 |
| 6,546,602 B1 * | 4/2003 | Eipper et al. | 24/442 |
| 6,593,540 B1 | 7/2003 | Baker et al. | 219/121.63 |
| 6,598,274 B1 * | 7/2003 | Marmaropoulos | 24/451 |
| 6,605,795 B1 | 8/2003 | Arcella et al. | 219/121.63 |
| 6,681,849 B2 | 1/2004 | Goodson | 166/66.5 |
| 6,740,094 B2 | 5/2004 | Maitland et al. | 606/108 |
| 6,742,227 B2 | 6/2004 | Ulicny et al. | 24/442 |
| 6,766,566 B2 | 7/2004 | Cheng et al. | 24/452 |
| 6,797,914 B2 | 9/2004 | Speranza et al. | 219/121.64 |
| 6,815,873 B2 | 11/2004 | Johnson et al. | 310/331 |
| 2001/0040819 A1 | 11/2001 | Hayashi et al. | |
| 2002/0007884 A1 | 1/2002 | Schuster et al. | |
| 2002/0050045 A1 | 5/2002 | Chiodo | 29/426.5 |
| 2002/0062547 A1 | 5/2002 | Chiodo et al. | 29/426.5 |
| 2002/0076520 A1 | 6/2002 | Neeb et al. | 428/100 |
| 2002/0086152 A1 * | 7/2002 | Gambino et al. | 428/327 |
| 2002/0142119 A1 | 10/2002 | Seward et al. | 428/36.9 |
| 2003/0120300 A1 | 6/2003 | Porter | 606/191 |
| 2004/0025639 A1 | 2/2004 | Shahinpoor et al. | 75/722 |
| 2004/0033336 A1 | 2/2004 | Schulte | 428/100 |
| 2004/0074061 A1 | 4/2004 | Ottaviani et al. | 24/442 |
| 2004/0074062 A1 | 4/2004 | Stanford et al. | 24/442 |
| 2004/0074064 A1 | 4/2004 | Powell et al. | 24/442 |
| 2004/0074067 A1 | 4/2004 | Browne et al. | 24/442 |
| 2004/0074068 A1 | 4/2004 | Browne et al. | 24/442 |
| 2004/0074069 A1 | 4/2004 | Browne et al. | 24/442 |
| 2004/0074070 A1 | 4/2004 | Momoda et al. | 24/442 |
| 2004/0074071 A1 | 4/2004 | Golden et al. | 24/442 |
| 2004/0117955 A1 | 6/2004 | Barvosa-Carter et al. | 24/442 |

FOREIGN PATENT DOCUMENTS

| | | |
|---|---|---|
| EP | 0385443 | 9/1990 |
| EP | 0673709 | 9/1995 |
| JP | 401162587 | 6/1989 |
| JP | 4-314446 | 4/1992 |
| JP | 4266970 | 9/1992 |
| JP | 08260748 | 10/1996 |
| WO | WO 99/42528 | 8/1999 |
| WO | WO 00/62637 | 10/2000 |
| WO | WO 01/84002 | 11/2001 |
| WO | WO 02/45536 | 6/2002 |

* cited by examiner

MAGNETIC FIELD OFF

Fig. 1A

MAGNETIC FIELD ON

LOCKED

Fig. 5

UN-LOCKED

Fig. 7 ated by using the strength of the applied magnetic field.
RELEASABLE FASTENER SYSTEM

CROSS-REFERENCE TO RELATED APPLICATIONS

This application is a continuation-in-part of U.S. application Ser. No. 10/273,691 filed Oct. 19, 2002, which is incorporated by reference herein in its entirety.

BACKGROUND

This disclosure relates to releasable attachment devices of the type used to fasten, retain, or latch together components of an apparatus or a structure that are to be separated or released under controlled conditions.

Hook and loop type separable fasteners are well known and are used to join two members detachably to each other. These types of fasteners generally have two components disposed on opposing member surfaces. One component typically includes a plurality of resilient hooks while the other component typically includes a plurality of loops. When the two components are pressed together they interlock to form a releasable engagement. A variation on the hook and loop motif is the hook and hook motif. The resulting joint created by the engagement is relatively resistant to shear and pull forces, and weak in peel strength forces. As such, peeling one component from the other component can be used to separate the components with a minimal applied force. As used herein, the term "shear" refers to an action or stress resulting from applied forces that causes or tends to cause two contiguous parts of a body to slide relatively to each other in a direction parallel to their plane of contact. The term "pull force" refers to an action or stress resulting from applied forces that causes or tends to cause two contiguous parts of a body to move relative to each other in a direction perpendicular to their plane of contact.

Figure 1A:
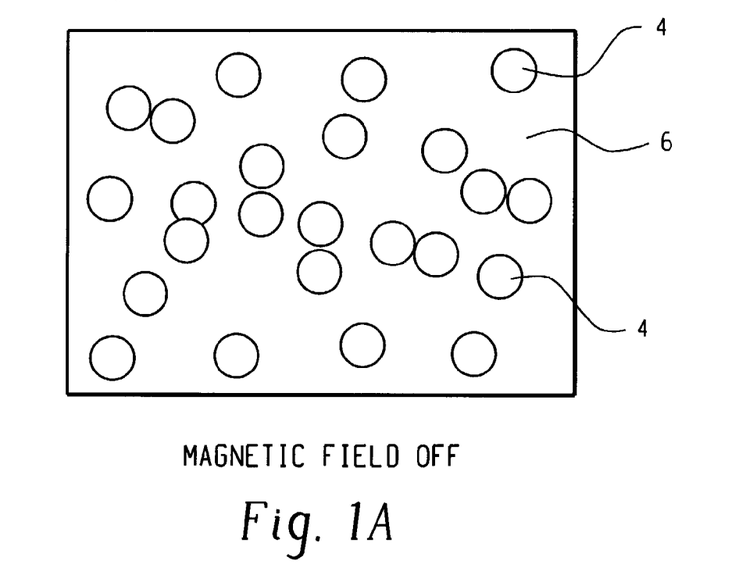
FIG. 1 is a schematic of a magnetorheological fluid.
Figure 1B:
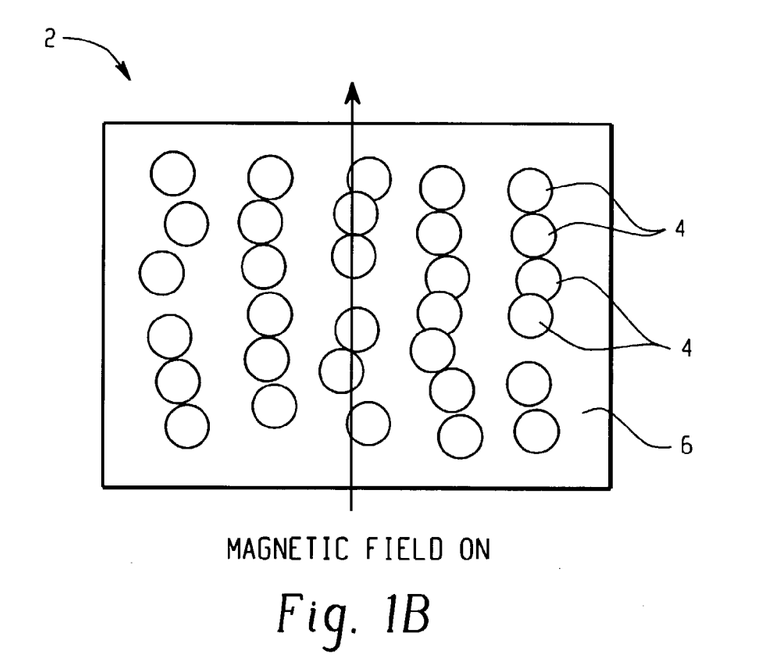

Magnetorheological (MR) fluids and elastomers are known as "smart" materials whose rheological properties can rapidly change upon application of a magnetic field. MR fluids are suspensions of micrometer-sized, magnetically polarizable particles in oil or other liquids. As shown in FIG. 1, when a MR fluid 2 is exposed to a magnetic field, the normally randomly oriented particles 4 within the fluid 6 form chains of particles in the direction of the magnetic field lines. The particle chains increase the apparent viscosity (flow resistance) of the fluid. MR elastomers are suspensions of micrometer-sized, magnetically polarizable particles in a thermoset elastic polymer or rubber. The stiffness of the elastomer structure is accomplished by changing the shear and compression/tension moduli by varying the strength of the applied magnetic field. The MR fluids and elastomers typically develop structure when exposed to a magnetic field in as little as a few milliseconds. Discontinuing the exposure of the MR fluid or elastomers to the magnetic field reverses the process and the fluid returns to a lower viscosity state or the elastomer returns to its lower modulus state. MR fluids enclosed in structural elements have been disclosed in U.S. Pat. No. 5,547,049.

BRIEF SUMMARY

Disclosed herein is a releasable fastener system that provides for a controlled release or separation of a joint in a shear and/or pull-off direction. A releasable fastener system comprises a first portion comprising a first support and a plurality of first hook elements disposed on a surface, wherein the first hook elements comprise head elements at ends of the first hook elements; a second portion comprising a second support and a plurality of second hook elements disposed on a surface, wherein the second hook elements comprise head elements at ends of the second hook elements, wherein the head elements of the second hook elements comprise a material adapted to change a directional orientation of the head elements of the second hook elements upon receipt of a magnetic signal; and an activation device coupled to the plurality of the second hook elements, the activation device being operable to selectively provide the magnetic signal to the head elements of the second hook elements, wherein the magnetic signal effectuates a change in the directional orientation of the head elements of the second hook elements to reduce or increase a shear force and/or a pull-off force.

In another embodiment the first hook elements also comprise a material adapted to change a directional orientation of the head elements of the first hook elements upon receipt of a magnetic signal.

A process for operating a releasable fastener system, the process comprises contacting a first portion to a second portion to form a releasable engagement, wherein the first portion comprises a first support and a plurality of first hook elements disposed on a surface, wherein the first hook elements comprise head elements at ends of the first hook elements; and a second portion comprising a second support and a plurality of second hook elements disposed on a surface, wherein the second hook elements comprise head elements at ends of the second hook elements, wherein the head elements of the second hook elements comprise a material adapted to change a directional orientation of the head elements of the second hook elements upon receipt of a magnetic signal; maintaining constant shear and pull-off forces in the releasable engagement; selectively introducing the magnetic signal to the head elements of the second hook elements, wherein the magnetic signal is effective to change the directional orientation of the head elements of the second hook elements; and reducing shear and/or pull-off forces in the releasable engagement.

A hook portion for a releasable fastener system comprises a support; and a plurality of hook elements disposed on a surface, wherein the hook elements comprise head elements at ends of the hook elements, and wherein the head elements comprise a material adapted to change a directional orientation of the head elements upon receipt of a magnetic signal.

The above described and other features are exemplified by the following figures and detailed description.

BRIEF DESCRIPTION OF THE DRAWINGS

Referring now to the figures, which are exemplary embodiments and wherein the like elements are numbered alike.

DETAILED DESCRIPTION

Figure 2:
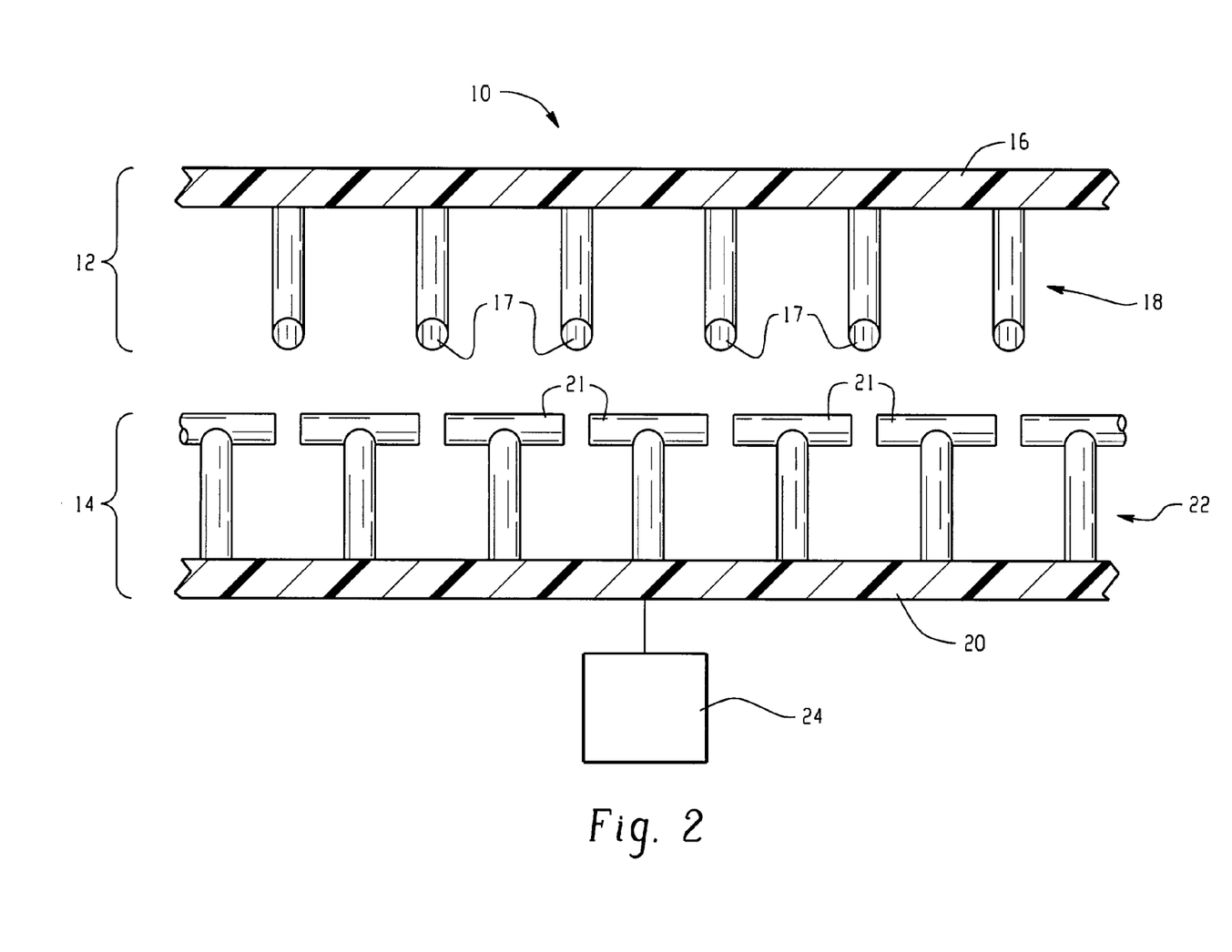
FIG. 2 is a cross sectional view of a releasable fastening system.

As shown in FIG. 2, a releasable fastener system, generally indicated as 10, comprises a first hook portion 12 and a second hook portion 14. The first hook portion 12 includes a support 16 and a plurality of closely spaced upstanding first hook elements 18 extending from one side thereof. At the ends of the first hook elements are first head elements 17. The second hook portion 14 includes a support 20 and a plurality of closely spaced upstanding second hook elements 22 extending from one side thereof. At the ends of the second hook elements are second head elements 21. The second head elements 21 are formed of a material that provide a directional orientation capability to the second head elements 21, as will be described in greater detail. Preferably, the second head elements are fabricated from materials that are resilient and flexible in addition to providing a directional orientation capability. Coupled to and in operative communication with the second head elements 21 is an activation device 24. The activation device 24, on demand, provides an activation signal to the second head elements 21 to change the directional orientation of the second head elements 21. The activation signal provided by activation device 24 for changing the directional orientation of the second head elements 21 is a magnetic signal in the form of a magnetic field. The change in directional orientation generally remains for the duration of the applied activation signal. Upon discontinuation of the activation signal, the second head elements 21 revert substantially to a relaxed or unpowered orientation, and as such, are free to swivel about the central axis of the support. The illustrated releasable fastener system 10 is exemplary only and is not intended to be limited to any particular shape, size, configuration, number or shape of second head elements 21, second hook elements 22, first head elements 17, first hook elements 18, or the like.

During engagement, the two portions 12 and 14 are pressed together to create a joint that is relatively strong in shear and pull-off directions, and weak in a peel direction. For example, when the two portions 12 and 14 are pressed into face-to-face engagement, the first head elements 17 become engaged with the second head elements 21 and the close spacing of the hook elements 18 and 22 resists substantial lateral movement when subjected to shearing forces in the plane of engagement. Similarly, when the engaged joint is subjected to a force perpendicular to this plane, (i.e., pull-off forces), the interlocked first head elements 17 and second head elements 21 resist substantial separation of the two portions 12 and 14. However, when the second head elements 21 are subjected to a peeling force, the second head elements 21 and the first head elements 17 can become disengaged from one another. It should be noted that separating the two portions 12 and 14 using the peeling force generally requires that one or both of the supports forming the hook portions be flexible.

Figure 3:
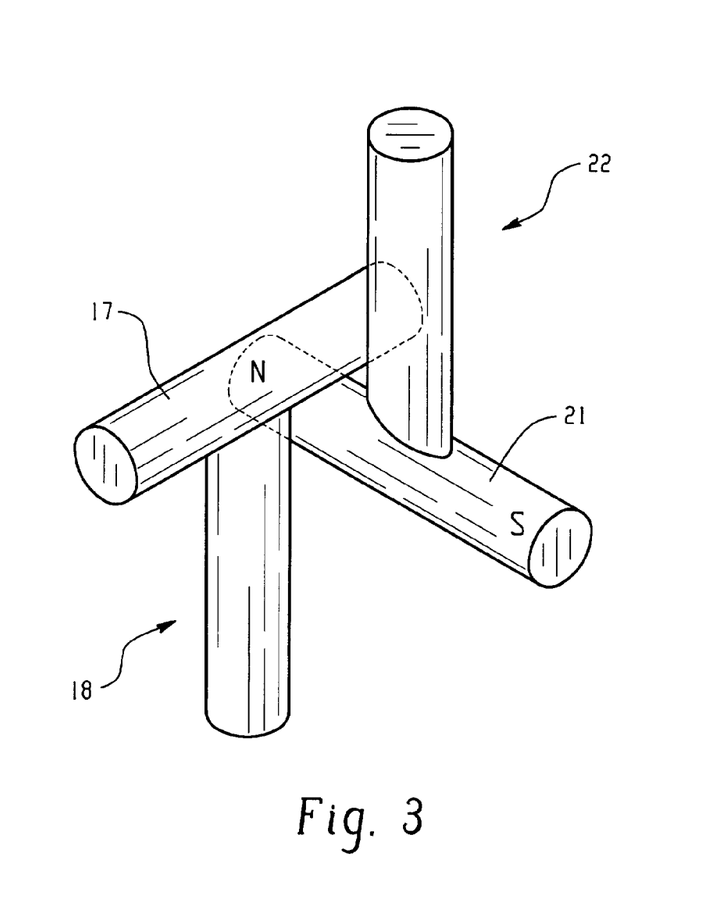
FIG. 3 is a schematic of magnetic swivel hooks in a locked position.
Figure 4:
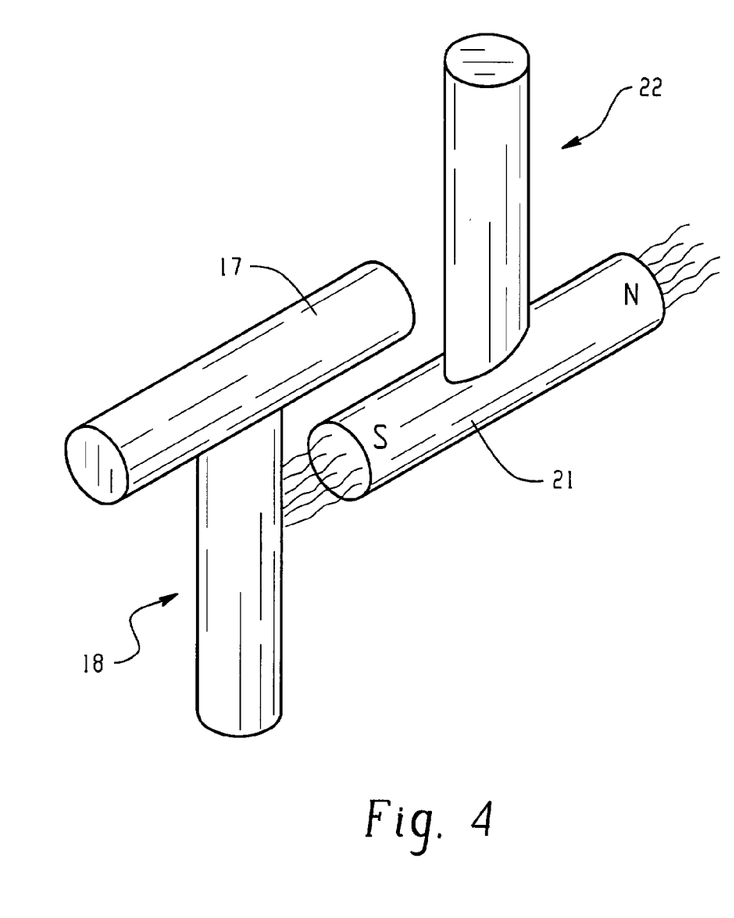
FIG. 4 is a schematic of magnetic swivel hooks in an unlocked position.
Figure 5:
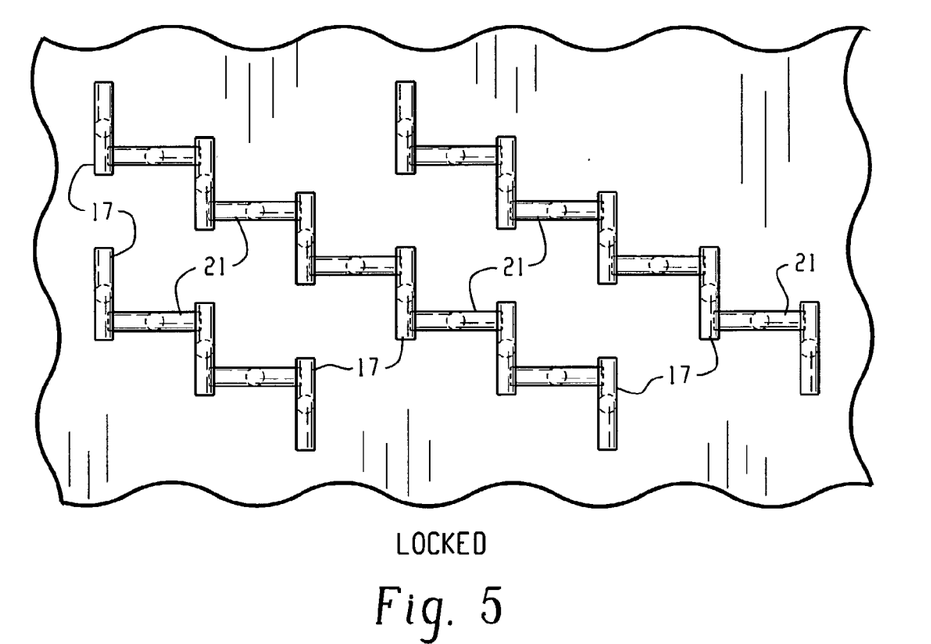
FIG. 5 is a schematic of an overhead view of magnetic swivel hooks in a locked position.
Figure 6:
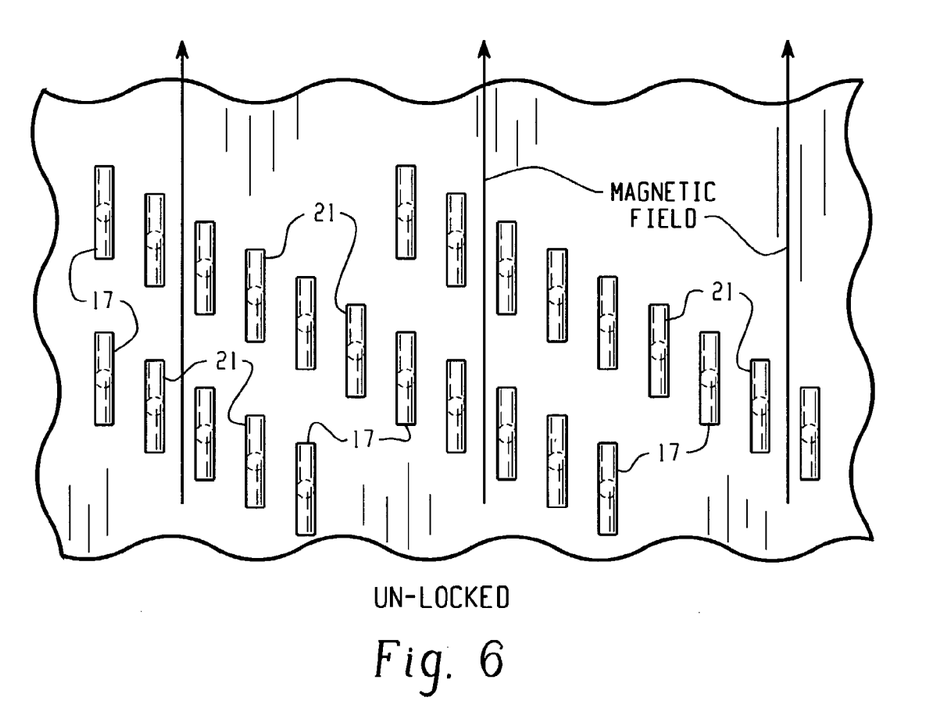
FIG. 6 is a schematic of an overhead view of magnetic swivel hooks in an unlocked position.

To reduce shear and pull-off forces resulting from the engagement, the directional orientation of the second head elements 21 is altered upon receipt of the activation signal from the activation device 24 to provide a remote releasing mechanism of the engaged joint. An exemplary directional orientation change of second head elements 21 is from an orientation substantially perpendicular to the first head elements 17 to an orientation substantially parallel to the first head elements 17. As a result of changing the directional orientation of the second head elements 21, a marked reduction in shear and pull-off forces is observed, thereby allowing the joint to separate in directions normally associated with pull-off and shear. That is, the change in directional orientation reduces the shearing forces in the plane of engagement, and reduces the pull-off forces perpendicular to the plane of engagement. In effect, the second head elements swivel so that they align with the first head elements allowing for the joint to separate with less force. For example, as shown in FIGS. 3 and 5, the second hook elements 22 have second head elements 21 oriented substantially perpendicular to the first head elements 17. In FIGS. 4 and 6 the directional orientation of the second head elements 21 are reoriented, upon receiving an activation signal from the activation device 24, to a substantially parallel orientation to the first head elements 17. The substantially parallel orientation relative to the orientation of first head elements provides a joint with marked reductions in shear and pull-off forces.

In another embodiment the receipt of an activation signal from activation device 24 increases shear and pull-off forces of the engaged joint. Upon receipt of the activation signal, the second head elements 21 can be oriented to maintain a substantially perpendicular orientation to the first head elements 17. During the time the activation signal is on, the peeling force required to separate portions 12 and 14 is increased by the maintenance of the interlocking system of the first and second head elements 17 and 21.

The hook elements 22 may be formed integrally with support 20, or more preferably, may be disposed on the support 20. In practice, the spacing between adjacent second hook elements 22 and second head elements 21 is an amount effective to provide sufficient shear and pull-off resistance desired for the particular application during engagement with first hook elements 18 and first head elements 17. Depending on the desired application, the amount of shear and pull-off force required for effective engagement can vary significantly. Generally, the closer the spacing and the greater amount of hook elements employed will result in increased shear and pull-off forces upon engagement. The first and second head elements 17 and 21 of hook elements 18 and 22 preferably have a similar shape configured to become engaged with one another upon the pressing contact of the first portion 12 with the second portion 14. The first and second head elements 17 and 21 of hook elements 18 and 22 can have an inverted J-shaped orientation, an L-shape, a knob shape, a multi-tined anchor, a T-shape, a key shape, or any other form of a hook-like element that can function in the present system. Such elements are referred to herein as "hook-like", "hook-type", or "hook" elements whether or not they are in the shape of a hook. In an exemplary fastener, the "engaged" mode, the first head elements 17 are substantially perpendicular to the second head elements 21 (FIG. 5). In the "disengaged" mode the first head elements 17 are substantially parallel to the second head elements 21 (FIG. 6).

The first and second head elements have a length and a width, wherein the length is preferably longer than the width. A ratio of length versus width of the head elements is preferably in the range from about 2 to 1 to about 10 to 1.

Figure 7:
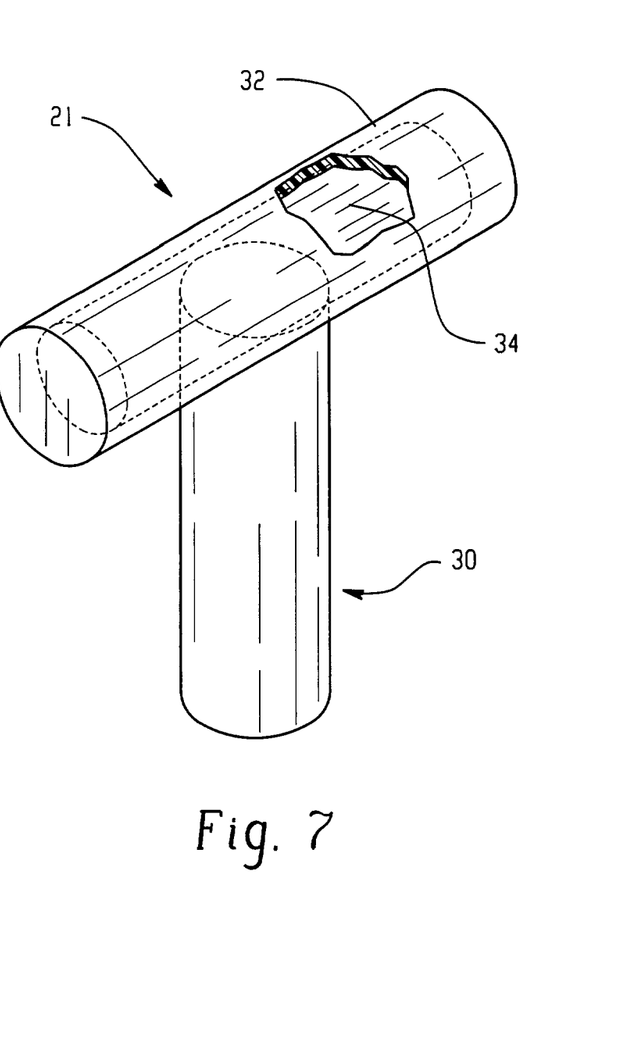
FIG. 7 is a schematic of a magnetic swivel hook, with an interior view of the hook's head.

In a preferred embodiment, the second head elements comprise a housing that surrounds the material adapted to change the directional orientation of the second head elements. In a non-limiting example, FIG. 7 is a view of a second hook element 22, and an interior view of the second head element 21. The material 34 adapted to change the directional orientation of the second head element is encased in housing 32. Suitable materials for fabricating the housing include plastics, metals, and the like. For example, suitable plastics include polytetrafluoroethylene and thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers.

Suitable materials for providing the directional orientation changing capability of the second head elements of the second hook elements include, but are not limited to, magnetic materials, magnetorheological fluids, magnetorheological elastomers, and the like.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure antiwear additives, antioxidants, thixotropic agents and conventional suspension agents. Carboxylate soaps include ferrous oleate, ferrous naphthenate, ferrous stearate, aluminum di- and tristearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

The activation device 24 can be configured to deliver an activation signal to the second head elements, wherein the activation signal comprises a magnetic signal. The magnetic signal is preferably a magnetic field. The strength and direction of the magnetic field is dependent on the particular material employed for fabricating the second head elements. The magnetic field may be generated by a permanent magnet, an electromagnet, or combinations comprising at least one of the foregoing. The magnitude of the applied field strength required is the amount needed to change a directional orientation of the second head elements to reduce or increase a shear force and/or pull-off force, depending upon the application. A non-limiting example is an amount and direction of magnetic field sufficient to change the directional orientation of the top of a T-shaped hook, rotating or swiveling the top of the "T" substantially in the x-plane by about 90 degrees from the original orientation (FIGS. 3 and 4). The rotation of the head substantially in the x-plane can be less than or equal to about 360 degrees from the original orientation, preferably less than or equal to about 270 degrees, and more preferably less than or equal to about 180 degrees from the original orientation. Also preferred is the rotation of the head substantially in the x-plane greater than or equal to about 20 degrees from the original orientation, more preferably greater than or equal to about 45 degrees, and most preferably greater than or equal to about 90 degrees from the original orientation.

Suitable magnetic field strengths for second hook elements comprised of MR fluids or elastomers range from about 0 to about 1 Tesla (T). Suitable magnetic field strengths for second hook elements comprised of magnetic materials range from about 0 to about 1 T.

The first hook elements 18 generally comprise first head elements at the ends of the hook elements. The first head elements are generally oriented in substantially the same direction/orientation. Materials suitable for manufacturing the first hook elements and first head elements include metals, thermoplastics such as polypropylene, polyethylene, polyamide, polyester, polystyrene, polyvinyl chloride, acetal, acrylic, polycarbonate, polyphenylene oxide, polyurethane, polysulfone, and the like. The first hook elements 18 may be integrated with the support or may be attached to the support.

The "stalks or shafts" 30 of the second hook elements 22 generally comprise materials other than those used for the second head elements 21. Suitable materials for manufacturing the shafts 30 of the second hook elements include, but are not limited to, metals and thermoplastics such as polypropylene, polyethylene, polyamide, polyester, polystyrene, polyvinyl chloride, acetal, acrylic, polycarbonate, polyphenylene oxide, polyurethane, polysulfone, and the like.

Figure 8:
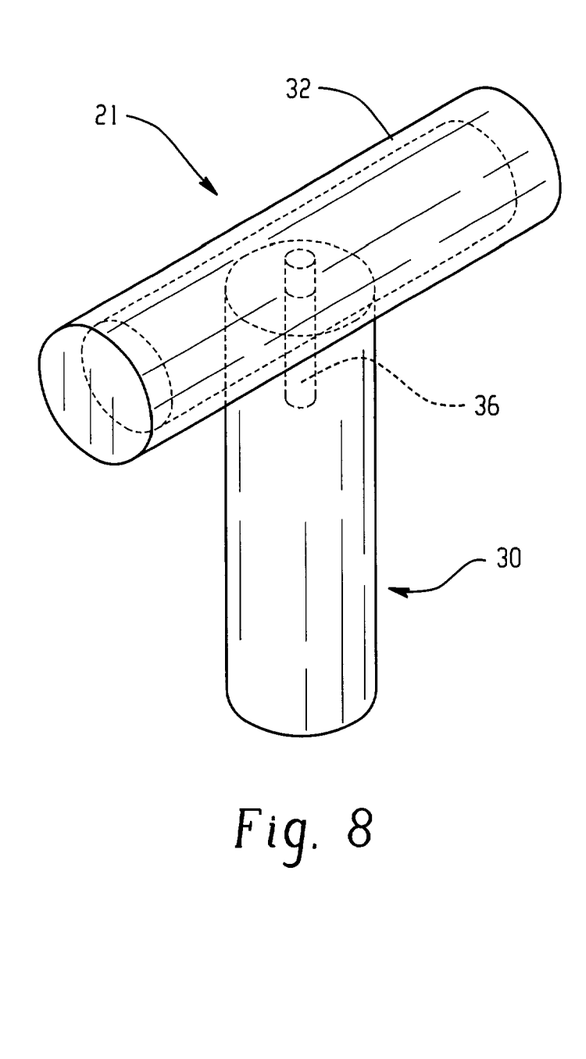
FIG. 8 is a schematic of a magnetic swivel hook.

The second head elements are fastened to the shafts of the second hook elements by any mechanical means that would allow the directional orientation of the second head elements to be affected. Non-limiting examples include springs, pins, swivels, and the like. In one embodiment the second head elements are preferably free to swivel about the stalks while in the unpowered state. In a preferred embodiment, after the magnetic signal is stopped, the second head elements resume the original directional orientation they had prior to receipt of the magnetic signal. In this embodiment, the second head elements may be fastened to the shafts of the second hook elements by welding, soldering, crimping, and the like. FIG. 8 shows a non-limiting example of second head element 21 connected to a shaft 30. A pin 36 connects the shaft 30 to housing 32.

The supports 16 (first portion 12) or 20 (second portion 14) may be rigid or flexible depending on the intended application. Suitable materials for fabricating the support include plastics, fabrics, metals, and the like. For example, suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers. An adhesive may be applied to the backside surface of the support (the surface free from the hook elements 22 or 18) for application of the releasable fastener system to an apparatus or structure. Alternatively, the releasable fastener system 10 may be secured to an apparatus or structure by bolts, by welding, or any other mechanical securement means. It should be noted that, unlike traditional hook and loop fasteners, both supports 16 and 20 could be fabricated from a rigid or inflexible material in view of the remote releasing capability provided. Traditional hook and loop fasteners typically require at least one support to be flexible so that a peeling force can be applied for separation of the hook and loop fastener.

The support 20 may also comprise the activation device 24 for providing the activating signal to the hook elements. For example, the support 20 may be an electromagnet for providing a magnetic signal, or a rotatable permanent magnet or a series of rotatable permanent magnets.

In one embodiment, the second portion comprises a surface that contains an array of second hook elements comprising second head elements fabricated from magnetic material. When a magnetic field is applied, the magnetic head elements orient themselves in the direction of the applied magnetic field. The fastener system is "unlocked" by the orientation of the second head elements, which swivel out of the way of the first head elements.

In another embodiment, the second portion comprises a surface that contains an array of second hook elements comprising second head elements fabricated from magnetorheological fluids. When a magnetic field is applied, the MR fluid "stiffens" in the direction of the applied magnetic field and orients the head of the second hook elements in the direction of the magnetic field.

In another embodiment, magnetorheological elastomers are used to fabricate the second head elements.

In yet another embodiment the first and second hook elements are in a substantially disorganized orientation in the unpowered state. In one embodiment the second hook elements are substantially parallel to one another in the unpowered state. In another embodiment the second hook elements are substantially parallel to one another and substantially perpendicular to the second head elements in the unpowered state. In yet another embodiment the second hook elements are substantially parallel to one another and substantially parallel to the second head elements in the unpowered state.

In a highly preferred embodiment, the first head elements and the second head elements comprise a material adapted to change a directional orientation of the first and second head elements. When the magnetic field is applied, both the first head elements and the second head elements rotate to form an interlocking system. The system may be "engaged" or "disengaged" by a change in direction of the magnetic field.

In another embodiment, a permanent magnet is located at the base of the second head elements, the magnet being freely rotatable upon demand. The system is locked when the magnet is rotated to orient the second head elements in a locking position with the first head elements.

Terms to "first" and "second" are only identifiers and are not intended to illustrate a position, sequence, order, etc.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A releasable fastener system comprising:
   a first portion comprising a first support and a plurality of first hook elements disposed on a surface, wherein each one the first hook elements comprise a head elements disposed on a shaft;
   a second portion comprising a second support and a plurality of second hook elements disposed on a surface, wherein each one of the second hook elements comprises a head elements rotatably disposed on a shaft, wherein the head elements comprises a material adapted to change a directional orientation upon receipt of a magnetic signal; and
   an activation device coupled to the plurality of the second hook elements, the activation device being operable to selectively provide the magnetic signal to the head elements of the second hook elements, wherein the magnetic signal effectuates a change in the directional orientation of the head elements of the second hook elements to reduce or increase a shear force and/or a pull-off force.

2. The releasable fastener system of claim 1, wherein the magnetic signal comprises a magnetic field oriented in a direction to effectuate a change in the directional orientation of the head elements of the second hook elements by rotating the head elements of the second hook elements substantially in an x-plane with respect to the hook element support.

3. The releasable fastener system of claim 1, wherein the first and second head elements comprise a J-shape, an L-shape, a multi-tined anchor shape, or a T-shape.

4. The releasable fastener system of claim 1, wherein the first hook elements engage with the second hook elements when the first portion is pressed into face-to-face engagement with the second portion.

5. The releasable fastener system of claim 1, wherein the magnetic signal effectuates a change in position of the first and second head elements, wherein the second head elements are substantially parallel to the first head elements, to reduce a shear force and/or a pull-off force.

6. The releasable fastener system of claim 1, wherein the magnetic signal effectuates a change in position of the first and second head elements, wherein the second head elements are substantially perpendicular to the first head elements forming an interlocking system to increase a shear force and/or a pull-off force.

7. The releasable fastener system of claim 1, wherein the second head elements comprise a magnetic material, a magnetorheological fluid, a magnetorheological elastomer, or combinations comprising at least one of the foregoing materials.

8. The releasable fastener system of claim 1, wherein the second head elements comprise ferromagnetic or paramagnetic particles dispersed in a carrier fluid,
   wherein the particles are selected from the group consisting of iron, iron alloys, iron oxides, iron nitride, iron carbide, carbonyl iron, nickel, cobalt, chromium dioxide, stainless steel, silicon steel, and combinations comprising at least one of the foregoing; and
   wherein the carrier fluid is selected from the group consisting of silicone oils, mineral oils, paraffin oils, silicone copolymers, white oils, hydraulic oils, transformer oils, halogenated paraffins, perfluorinated polyethers and fluorinated hydrocarbons, diesters, polyoxyalkylenes, fluorinated silicones, cyanoalkyl siloxanes, glycols, synthetic hydrocarbon oils, and combinations comprising at least one of the foregoing fluids.

9. The releasable fastener system of claim 1, wherein the second head elements comprise ferromagnetic or paramagnetic particles in poly-alpha-olefins, natural rubber, silicone, polybutadiene, polyethylene, polyisoprene, or combinations comprising at least one of the foregoing polymeric materials.

10. The releasable fastener system of claim 1, wherein the second head elements comprise a magnetic material based on iron, nickel, cobalt, alloys of the foregoing, or combinations comprising at least one of the foregoing.

11. The releasable fastener system of claim 1, wherein the first head elements comprise a material adapted to change a directional orientation of the head elements of the first hook elements upon receipt of a magnetic signal.

12. The releasable fastener system of claim 11, wherein the magnetic signal comprises a magnetic field oriented in a direction to effectuate a change in the directional orientation of the head elements of the first and second hook elements by rotating the head elements of the first and second hook elements substantially in an x-plane with respect to the first and second supports.

13. The releasable fastener system of claim 12, wherein the change in the directional orientation of the first and second head elements reduces a shear force and/or pull-off force.

14. The releasable fastener system of claim 12, wherein the change in the directional orientation of the first and second head elements increases a shear force and/or pull-off force.

15. A process for operating a releasable fastener system, the process comprising:
   contacting a first portion to a second portion to form a releasable engagement,
   wherein the first portion comprises a first support and a plurality of first hook elements disposed on a surface, wherein each one of the first hook elements comprise a head element disposed on a shaft; and
   a second portion comprising a second support and a plurality of second hook elements disposed on a surface, wherein each one of the second hook elements comprise a head element rotatably disposed on a shaft, wherein the head elements comprises a material adapted to change a directional orientation to the head elements upon receipt of a magnetic signal;
   maintaining constant shear and pull-off forces in the releasable engagement;
   selectively introducing the magnetic signal to the second hook elements, wherein the magnetic signal is effective to change the directional orientation of the head elements; and
   reducing shear and/or pull-off forces in the releasable engagement.

16. The process according to claim 15, wherein the second head elements comprise a magnetic material, a magnetorheological fluid, a magnetorheological elastomer, or combinations comprising at least one of the foregoing materials.

17. The process according to claim 15, wherein the magnetic signal comprises a magnetic field oriented in a direction to effectuate a change in the directional orientation to the second head elements by rotating the second head elements substantially in an x-plane with respect to the second support.

18. The process according to claim 15, wherein the first head elements comprise a material adapted to change a directional orientation of the first head elements upon receipt of a magnetic signal.

19. The process according to claim 15, wherein the magnetic signal comprises a magnetic field oriented in a direction to effectuate a change in the directional orientation of the first and second head elements by rotating the first and second head elements substantially in an x-plane with respect to the first and second supports.

20. A hook portion for a releasable fastener system comprising:
a support; and
a plurality of hook elements disposed on a surface, wherein each one of the hook elements comprise a head element rotatably disposed on a shaft, wherein the head elements comprises a material adapted to change a directional orientation to the head elements upon receipt of a magnetic signal, wherein the magnetic signal is a magnetic field oriented in a direction to effectuate a change in the directional orientation to the head elements by rotation of the head elements substantially in an x-plane with respect to the support, and wherein the head elements comprise a magnetic material, a magnetorheological fluid, a magnetorheological elastomer, or combinations comprising at least one of the foregoing materials.

21. The hook portion according to claim 20, wherein the support comprises a metal, a plastic, a fabric, or a combination comprising at least one of the foregoing materials.

22. A process for operating a releasable fastener system, the process comprising:
providing a first portion comprising a first support and a plurality of first hook elements disposed on a surface, wherein each one of the first hook elements comprise a head elements disposed on a shaft;
applying a magnetic signal to a second portion comprising a second support and a plurality of second hook elements disposed on the support, wherein each one of the second hook elements comprises a head elements rotatably disposed on a shaft, and wherein the second head elements comprise a material adapted to change a directional orientation upon receipt of a magnetic signal;
contacting the first portion with the second portion; and
discontinuing the magnetic signal to cause the first hook elements and the second hook elements to interlock.

23. A releasable fastener system comprising:
a first portion comprising a first support and a plurality of first hook elements disposed on a surface, wherein each one of the first hook elements comprises a head elements rotatably disposed on a shaft; and
a second portion comprising a second support and a plurality of second hook elements disposed on a surface, wherein each one of the second hook elements comprises a head element rotatably disposed on a shaft, wherein the second head elements comprise a material adapted to change a directional orientation upon receipt of a magnetic signal, and wherein the magnetic signal comprises a magnetic field oriented in a direction to effectuate a change in the directional orientation of the first and second head elements by rotating the first and second head elements substantially in an x-plane with respect to the first and second supports; and
means for changing the directional orientation of the second head elements to reduce a shear force and/or a pull-off force of engaged first hook elements and second hook elements.

24. The releasable fastener system according to claim 23, wherein the first support and the second support are fabricated from an inflexible material.

25. The releasable fastener system according to claim 23, wherein the first head elements comprises a material adapted to change a directional orientation upon receipt of a magnetic signal.

26. A hook portion for a releasable fastener system comprising;
a support; and
a plurality of hook elements disposed on a surface, wherein each one of the hook elements comprise a head element rotatably disposed on a shaft, wherein the head elements comprise a material adapted to change a directional orientation upon receipt of a magnetic signal, and wherein the magnetic signal is a magnetic field oriented in a direction to effectuate a change in the directional orientation by rotation substantially in an x-plane with respect to the support.

27. The hook portion according to claim 26, wherein the head elements comprise a magnetic material, a magnetorheological fluid, a magnetorheological elastomer, or combinations comprising at least one of the foregoing materials.

28. The hook portion according to claim 26, wherein the support comprises a metal, a plastic, a fabric, or a combination comprising at least one of the foregoing materials.

* * * * *